(12) United States Patent
Baranovskis

(10) Patent No.: US 6,630,763 B1
(45) Date of Patent: Oct. 7, 2003

(54) SOLID CORE ANGULAR POSITION RESOLVER

(75) Inventor: Paul Baranovskis, Evanston, IL (US)

(73) Assignee: MPC Products Corporation, Niles, IL (US)

( * ) Notice: Subject to any disclaimer, the term of this patent is extended or adjusted under 35 U.S.C. 154(b) by 0 days.

(21) Appl. No.: 09/878,612

(22) Filed: Jun. 11, 2001

(51) Int. Cl.⁷ .............................................. H02K 17/00
(52) U.S. Cl. ....................................... 310/166; 310/216
(58) Field of Search .......................... 310/166, 12, 13, 310/14, 15, 36, 172, 261

(56) References Cited

U.S. PATENT DOCUMENTS

| | | |
|---|---|---|
| 3,796,899 A | 3/1974 | Giachello |
| 4,135,119 A * | 1/1979 | Brosens ........................ 310/36 |
| 4,255,682 A | 3/1981 | Toida |
| 4,445,103 A | 4/1984 | Chass |
| 4,560,894 A * | 12/1985 | Stroll ........................ 310/67 R |
| 4,888,513 A * | 12/1989 | Fratta ........................ 310/261 |
| 5,057,727 A | 10/1991 | Jones |
| 5,160,886 A | 11/1992 | Carlen |
| 5,250,889 A | 10/1993 | Ezuka |
| 5,404,101 A | 4/1995 | Logue |
| 5,446,966 A | 9/1995 | Ishizaki |
| 5,763,976 A | 6/1998 | Huard |
| 6,020,737 A | 2/2000 | Wyss |

* cited by examiner

Primary Examiner—Thanh Lam
(74) Attorney, Agent, or Firm—Michael, Best & Friedrich LLC

(57) ABSTRACT

A solid core angular position resolver including stator coils and a coil-less rotor, the improvement wherein the rotor comprises a core having a substantially circular cylindrical configuration having on its surface a notch extending substantially helically over part of the surface of the cylindrical configuration.

26 Claims, 1 Drawing Sheet

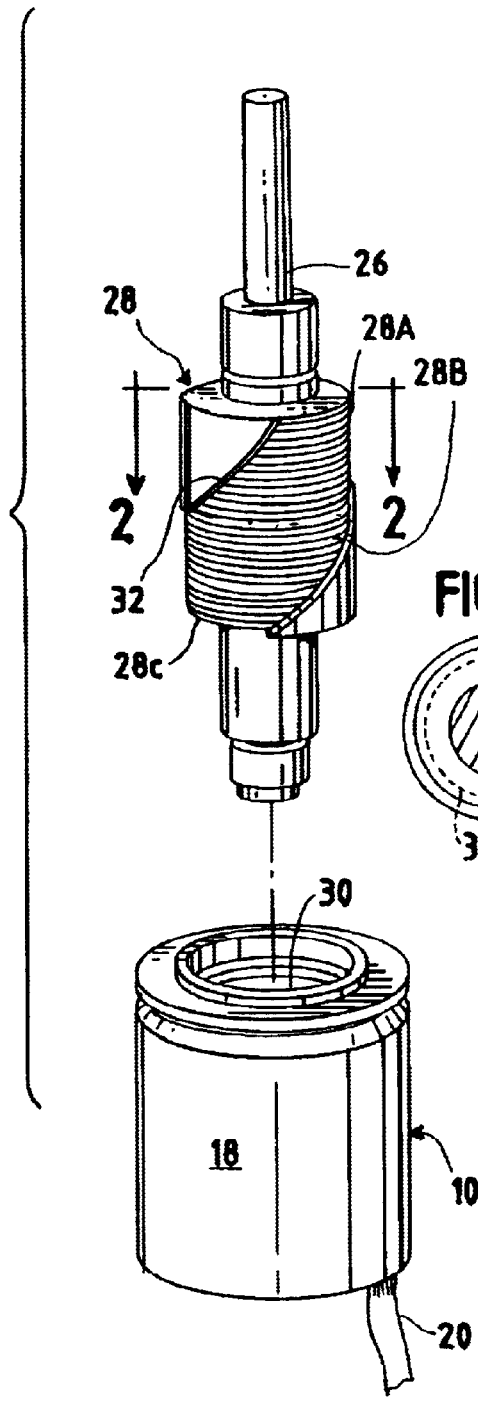
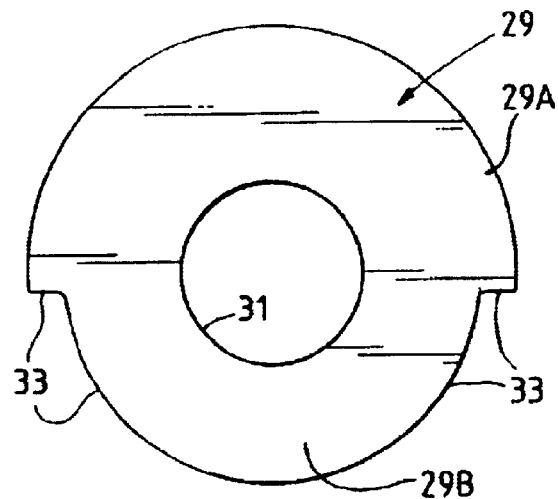
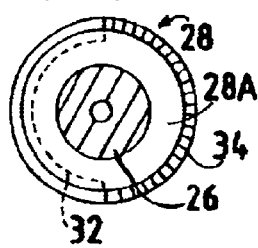
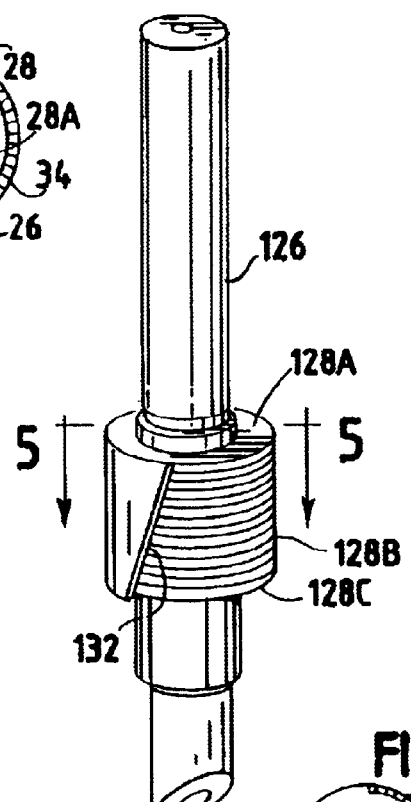
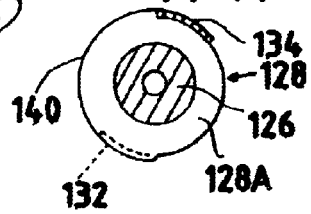

US 6,630,763 B1

SOLID CORE ANGULAR POSITION RESOLVER

The present invention relates to rotary electrical devices such as synchros and angular position transducers of the type known variously as resolvers, rotary inductors, rotary variable differential transducers, angular shaft position encoders, and the like. It particularly concerns such a device employing a solid rotor, i.e., one which has no electrical windings thereon.

THE PRIOR ART

Using an angular position resolver as an example, such a device has a rotor mounted on a rotatable shaft, which cooperates with a coil-wound stator to provide two sinusoidal voltage read-outs, the voltage magnitude relationship and phase relationship of which indicate the instantaneous angular position of the shaft over a range from 0 to 360 degrees of rotation. Coil-wound rotors (see e.g. Logue U.S. Pat. No. 5,404,101 and Chass U.S. Pat. No. 4,445,103) have been used in such devices, but they are difficult and expensive to manufacture, and often unreliable in use because the coils may develop electrical faults.

To overcome these problems, the art has developed a number of angular position resolvers with solid rotors, thus entirely eliminating the troublesome rotor windings. See Toida U.S. Pat. No. 4,255,682; Wyss U.S. Pat. No. 6,020,737; Huard U.S. Pat. No. 5,763,976; and Ishizaki U.S. Pat. No. 5,446,966. See also Carlen U.S. Pat. No. 5,160,886, and the prior art cited therein, for solid rotors which incorporate permanent magnets instead of windings. While these rotors achieve a degree of electrical simplification, a glance at the above-cited patents shows that they come in a variety of complex mechanical configurations, which can be costly to manufacture.

Accordingly, it is the principal object of this invention to provide a solid core rotor for a rotary electrical device which is simpler in its mechanical configuration and therefore more reliable in operation as well as less expensive to manufacture.

BRIEF SUMMARY OF THE INVENTION

The invention contemplates a rotary electrical device which employs a plurality of stator coils and a coil-less (i.e. solid) rotor within the stator coils comprising a ferromagnetic core having a substantially circular cylindrical configuration. The cylindrical configuration has on its surface a notch extending substantially helically thereabout for a selected circumferential distance. The notch enables the otherwise cylindrical configuration to induce respective voltages in the stator coils, the voltage magnitude relationship and phase relationship of which indicate the angular position of the rotor.

In a preferred embodiment, the axial length of the notch is equal to the axial length of the electromagnetic stator core, and the circumferential width of the notch from edge to edge is substantially 180 degrees. In some embodiments the circumferential extent of each individual edge of the notch over the axial length of the cylindrical configuration is 180 degrees, but it may also be less than that. The core is preferably formed of a stack of individual metal circular discs in facing relationship lying substantially perpendicular to the axis of the cylindrical configuration to form a series of eddy-current-blocking laminations. Each disc preferably has a semicircular gap formed at its outer periphery, and the notch is formed by skewing the semicircular laminations relative to each other at a rotational angle calculated to distribute these gaps helically over the entire core length. Alternatively, the notch could be formed by machining away a helical area of the surface of the cylindrical body.

All of the described rotor configurations are mechanically simpler and easier to fabricate than any previously known solid core rotor, and therefore are more economical, while at the same time enjoying the same electrical advantages as other solid core rotors.

THE DRAWINGS

The invention thus briefly summarized will now be described in detail in connection with the following drawings:

FIG. 1 is an exploded perspective view of the mechanical assembly of a first embodiment of an angular position resolver in accordance with this invention.

FIG. 2 is a sectional view of the shaft and rotor of the resolver, taken along the lines 2—2 of FIG. 1.

FIG. 3 is a plan view of a single lamination employed in the rotor of FIGS. 1 through 3.

FIG. 4 is a perspective view of the shaft and rotor of an alternate embodiment of the angular position resolver of this invention.

FIG. 5 is a sectional view of the shaft and rotor of the alternate embodiment, taken along the lines 5—5 of FIG. 4.

DETAILED DESCRIPTION OF THE PREFERRED EMBODIMENT

A resolver typically includes a stator structure 10 comprising two sensor coils 12 and 14 wound onto magnetic iron and enclosed within a hollow cylindrical casing 18. An electrical cable 20 emerges from the casing 18.

The purpose of the resolver is to sense the angular position of a rotating shaft 26. Toward that end, a solid (i.e., coil-less) rotor generally designated 28 is made of ferromagnetic metal and staked to the shaft in order to rotate therewith, and the shaft passes through a central opening 30 in the housing 18 and the coils 12 and 14 contained therein. The shaft 26 is located so that the rotor 28 remains within the opening 30, and also inside the stator coils 12 and 14, while rotating with the shaft 26.

The mode of operation of a solid core resolver (i.e., one with a coil-less rotor) is understood in the art. A sinusoidal input voltage to the stator coils 12 and 14 interacts magnetically with the material of the rotor 28 to induce sinusoidal output voltages in the coils. The coils are in quadrature, that is, they are physically located 90 degrees apart, so that these output voltages are out of phase with each other. The rotor 28 has a shape which departs from its overall cylindrical configuration, and that causes the voltage magnitude relationship and phase relationship between the output voltages to vary as a function of the angular position of the rotor, which in turn depends on the angular position of the shaft 26. Thus, the voltage magnitude relationship and phase relationship between the respective output voltages appearing on the stator coils indicate the angular position of the shaft 26. If desired, this shaft position indication can then be digitally encoded using known analog-to-digital circuitry.

In accordance with the present invention, the departure from cylindricity of the shape of the rotor 28 arises from its novel method of construction, which will now be described in detail.

Rotor 28 is a body substantially in the shape of a right circular cylinder, and is formed of a stack of individual laminations 28A, B, C etc. Each individual lamination is made of ferromagnetic material and is in the form of a thin, flat toroidal disc 29 having a central opening 31, and it is those central openings through which the shaft 26 passes. Each disc has a 180-degree gap 33 formed at its outer periphery, so that half of the disc is a semi-circle 29A of larger diameter, and the other half is a semi-circle 29B of smaller diameter. These gaps 33 combine to form a notch having edges 32 and 34. The individual laminations 28A, B, C, etc., are stacked in face-to-face relationship and skewed progressively relatively to each other so that the notch formed by all the gaps 33 wraps helically about the rotor core 28 over the entire rotor core length. The confronting faces of the individual laminations 28A, B, C, etc. are coated with a thin layer of shellac or similar material to limit eddy currents, as is well known in the electrical art.

The progressive skewing or relative rotation of the laminations 28 is such as to cause the notch edges 32 and 34 to be substantially parallel to each other, and to wrap substantially helically around the cylindrical body of the rotor 28, so that the space between those edges 32, 34 is in effect a helical notch having a width defined by the distance between the edges 32 and 34, measured around the circumference of the cylindrical body of the rotor 28. The length of the helical notch 32, 34 in the axial direction of the cylindrical rotor 28 is preferably equal to the entire axial length of the rotor (i.e., from the top of the first lamination 28A through the bottom of the last lamination 28C).

In the embodiment of FIGS. 1 through 3, the width of the notch between edges 32 and 34 is 180 degrees, measured about the circumference of the cylindrical rotor 28; and the rotor 28 is long enough in the axial direction so that the extent to which either edge 32 or 34 wraps circumferentially about the cylindrical rotor 28 over its entire axial length is also 180 degrees.

The embodiment of FIGS. 4 and 5 is similar in most respects to that of FIGS. 1 through 3, but the notch dimensions are somewhat different. In this second embodiment, notch edges 132 and 134 respectively are once again formed on a cylindrical rotor designated 128 formed of laminations 128A, B, C etc., and the rotor is staked to a rotating shaft 126 so as to rotate therewith. The rotor 128 cooperates electrically with the stator 10 in the same way described above. Here again, the width of the helical notch between the edges 132 and 134, measured circumferentially about the cylindrical rotor, is 180 degrees; and the axial length of the notch is equal to the entire axial length of the rotor 128 from the top of the first lamination 128A to the bottom of the last lamination 128B.

But in this embodiment, the extent to which any one edge 132 or 134 wraps circumferentially about the rotor over its entire axial length is less than 180 degrees. This variation appears to produce acceptable electrical results, just as the embodiment of FIGS. 1 through 3 does.

As an alternative to the skewed lamination technique described above, in either of these two described embodiments the helical notch can be formed by starting with either a solid or a laminated cylindrical body, and then machining away the material which occupies the space where the helical notch is desired.

Any of the described embodiments are both simpler and less expensive to manufacture than prior art solid rotors for resolvers and other types of rotary electrical equipment. In addition, the rotor structures disclosed herein are rugged and relatively resistant to malfunctions.

The above-described embodiments are merely illustrative, and the scope of protection to which the invention is entitled is defined in the following claims.

I claim:
1. In a rotary electrical device which has at least one stator coil and a coil-less rotor, the improvement wherein the rotor comprises a core having a substantially circular cylindrical configuration having on its surface a single notch extending in substantially a single circumference over the axial length of the cylindrical configuration helically over part of the surface thereof.

2. The device of claim 1 in which the rotor is formed of ferromagnetic material.

3. The device of claim 1 in which the axial length of the notch is equal to the axial length of the cylindrical configuration.

4. The device of claim 1 in which the circumferential width of the notch is substantially 180 degrees.

5. The device of claim 4 in which the circumferential extent of each individual edge of the notch over the axial length of the cylindrical configuration is substantially 180 degrees.

6. The device of claim 4 in which the circumferential extent of each individual edge of the notch over the axial length of the cylindrical configuration is substantially less than 180 degrees.

7. The device of claim 1 in which the core is formed of a stack of individual discs arranged in mutually facing relationship and formed with respective edge gaps, the plane of each disc lying substantially perpendicular to the axis of the cylindrical configuration whereby to form a series of laminations, the angular orientations of said laminations being progressively skewed relative to each other so as to distribute their respective gaps helically over the core whereby to form the helical notch.

8. The device of claim 1 in which the notch is formed by machining away a helical area of the surface of the cylindrical rotor.

9. In a rotary electrical device which has at least one stator coil and a coil-less rotor, the improvement wherein the rotor comprises a core with a substantially circular cylindrical configuration having on its surface a notch extending in substantially a single circumference over the axial length of the cylindrical configuration helically over part of the surface thereof, the circumferential width of the notch being not greater than substantially 180 degrees.

10. The device of claim 9 in which the rotor is formed of ferromagnetic material.

11. The device of claim 9 in which the axial length of the notch is equal to the axial length of the cylindrical configuration.

12. The device of claim 9 in which the circumferential width of the notch is substantially 180 degrees.

13. The device of claim 12 in which the circumferential extent of each individual edge of the notch over the axial length of the cylindrical configuration is substantially 180 degrees.

14. The device of claim 12 in which the circumferential extent of each individual edge of the notch over the axial length of the cylindrical configuration is less than substantially 180 degrees.

15. A coiless rotor for a solid core angular position resolver comprising:
a core having a substantially circular cylindrical configuration; and
a notch extending in substantially a single circumference over the axial length of the cylindrical configuration helically over part of the surface thereof.

16. The device of claim 15 in which the axial length of the notch is equal to the axial length of the cylindrical configuration.

17. The device of claim 15 in which the circumferential width of the notch is substantially 180 degrees.

18. The device of claim 17 in which the circumferential extent of each individual edge of the notch over the axial length of the cylindrical configuration is substantially 180 degrees.

19. The device of claim 15 in which the core is formed of a stack of individual discs arranged in mutually facing relationship and formed with respective edge gaps, the plane of each disc lying substantially perpendicular to the axis of the cylindrical configuration whereby to form a series of laminations, the angular orientations of said laminations being progressively skewed relative to each other so as to distribute their respective gaps helically over the core whereby to form the helical notch.

20. The device of claim 15 in which the notch is formed by machining away a helical area of the surface of the cylindrical rotor.

21. A coil-less rotor for a solid core angular position resolver device comprising:
   a core having a substantially-circular cylindrical configuration; and
   a single notch having a circumferential extent substantially a single circumference helically over the axial length of the surface of the cylindrical configuration.

22. The device of claim 21 in which the circumferential width of the notch is substantially 180 degrees.

23. The device of claim 21 in which the circumferential extent of each individual edge of the notch over the axial length of the cylindrical configuration is substantially 180 degrees.

24. The device of claim 21 in which the rotor is formed of ferromagnetic material.

25. The device of claim 21 in which the core is formed of a stack of individual discs arranged in mutually facing relationship and formed with respective edge gaps, the plane of each disc lying substantially perpendicular to the axis of the cylindrical configuration whereby to form a series of laminations, the angular orientations of said laminations being progressively skewed relative to each other so as to distribute their respective gaps helically over the core whereby to form the helical notch.

26. The device of claim 21 in which the notch is formed by machining away a helical area of the surface of the cylindrical rotor.

\* \* \* \* \*